United States Patent [19]
Acker

[11] 4,352,193
[45] Sep. 28, 1982

[54] INTENDED VALUE DETERMINATION SYSTEM

[75] Inventor: William F. Acker, Seminole, Fla.

[73] Assignee: Honeywell Inc., Minneapolis, Minn.

[21] Appl. No.: 210,093

[22] Filed: Nov. 24, 1980

Related U.S. Application Data

[60] Continuation of Ser. No. 100,751, Dec. 5, 1979, abandoned, which is a division of Ser. No. 829,705, Sep. 1, 1977, Pat. No. 4,207,523.

[51] Int. Cl.³ ............................................. H04B 1/10
[52] U.S. Cl. ..................................... 375/76; 328/163; 375/99
[58] Field of Search ....................... 328/162, 163, 164; 329/130; 375/76, 99, 104

[56] References Cited

U.S. PATENT DOCUMENTS

| | | | |
|---|---|---|---|
| 3,214,700 | 10/1965 | Hook | 375/76 X |
| 4,045,816 | 8/1977 | Cave | 328/163 X |
| 4,063,183 | 12/1977 | Evans | 328/163 |
| 4,186,384 | 1/1980 | Acker | 375/76 X |

Primary Examiner—John S. Heyman
Attorney, Agent, or Firm—Theodore F. Neils

[57] ABSTRACT

An expected level determination system is disclosed for determining the expected level of incoming analog signals at the receiver end of a digitally based communications channel. This is accomplished by a feedback loop based on apportionment.

6 Claims, 2 Drawing Figures

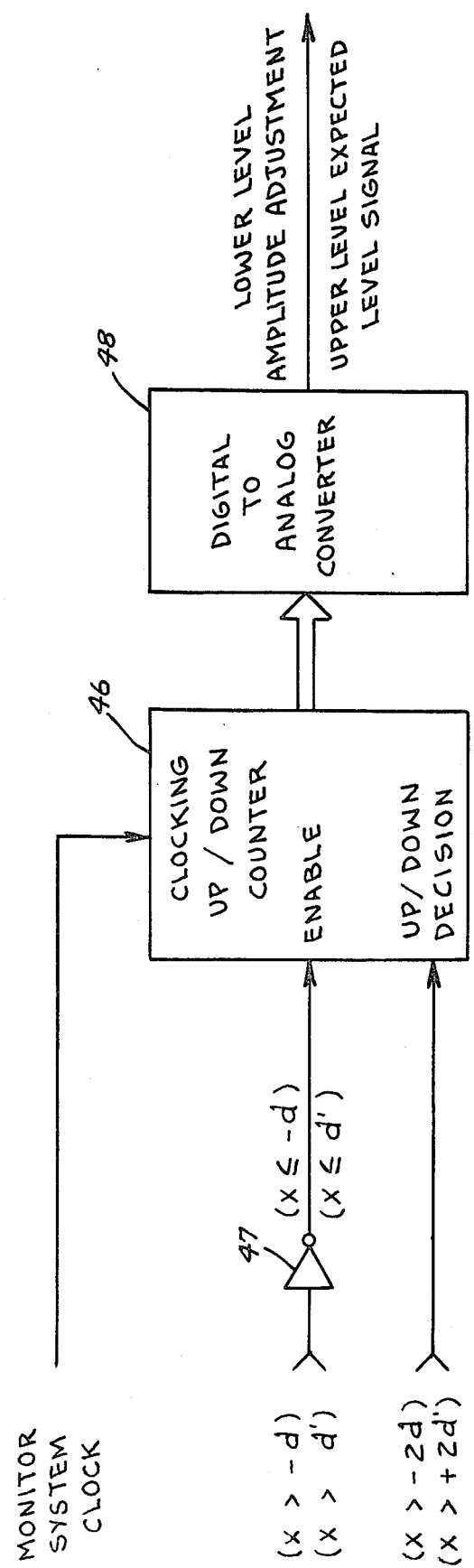

INTENDED VALUE DETERMINATION SYSTEM

The invention herein described was made in the course of, or under a contract, or subcontract thereunder, with the Department of the Air Force.

INTENDED VALUE DETERMINATION SYSTEM

This is a continuation of application Ser. No. 100,751 filed Dec. 5, 1979, and now abandoned, which was a division of application Ser. No. 829,705 filed Sept. 1, 1977, now U.S. Pat. No. 4,207,523 issued June 10, 1980. That patent is incorporated herein by reference.

BACKGROUND OF THE INVENTION

The present invention relates to apparatus for indicating the intended values of signals in digitally based communications channels and, more particularly, to apparatus for determining those intended values, comparing them with the observed values, and, if the intended and observed values differ, acting to reduce the discrepancy.

Communication channels can be entirely analog extending from the information source to the transmitter, and then along the channel link to the receiver, and finally to the user of the transmitted information. Communication channels can also be digitally based, either totally or partially. A typical situation is to have a digital information source but where the information is sent in analog form over an analog channel link to a receiver which reconverts the information to a digital format.

In systems using digital communications channels or communications channels having digital portions along the channel, i.e. digitally based communication channels hereinafter, the expected level of signals arriving at processing apparatus in or following the channel is often important information. For example, in apparatus to monitor channel degradation, the signal levels which are actually observed may be compared with the expected levels. Such a comparison may be used to detect channel degradation before it becomes great enough to introduce errors in the interpretation of the signals.

SUMMARY OF THE INVENTION

Apparatus is provided to compare the incoming baseband analog signal level at a receiver in a digitally based communications channel with the expected signal level with which it is associated. If the expected and actual values differ, a slow acting feedback loop is used either to vary a selected one of the incoming signal level and the expected level value.

BRIEF DESCRIPTION OF THE DRAWINGS

FIG. 1 is a system diagram of the present invention, and

DESCRIPTION OF THE PREFERRED EMBODIMENT

Figure 2:
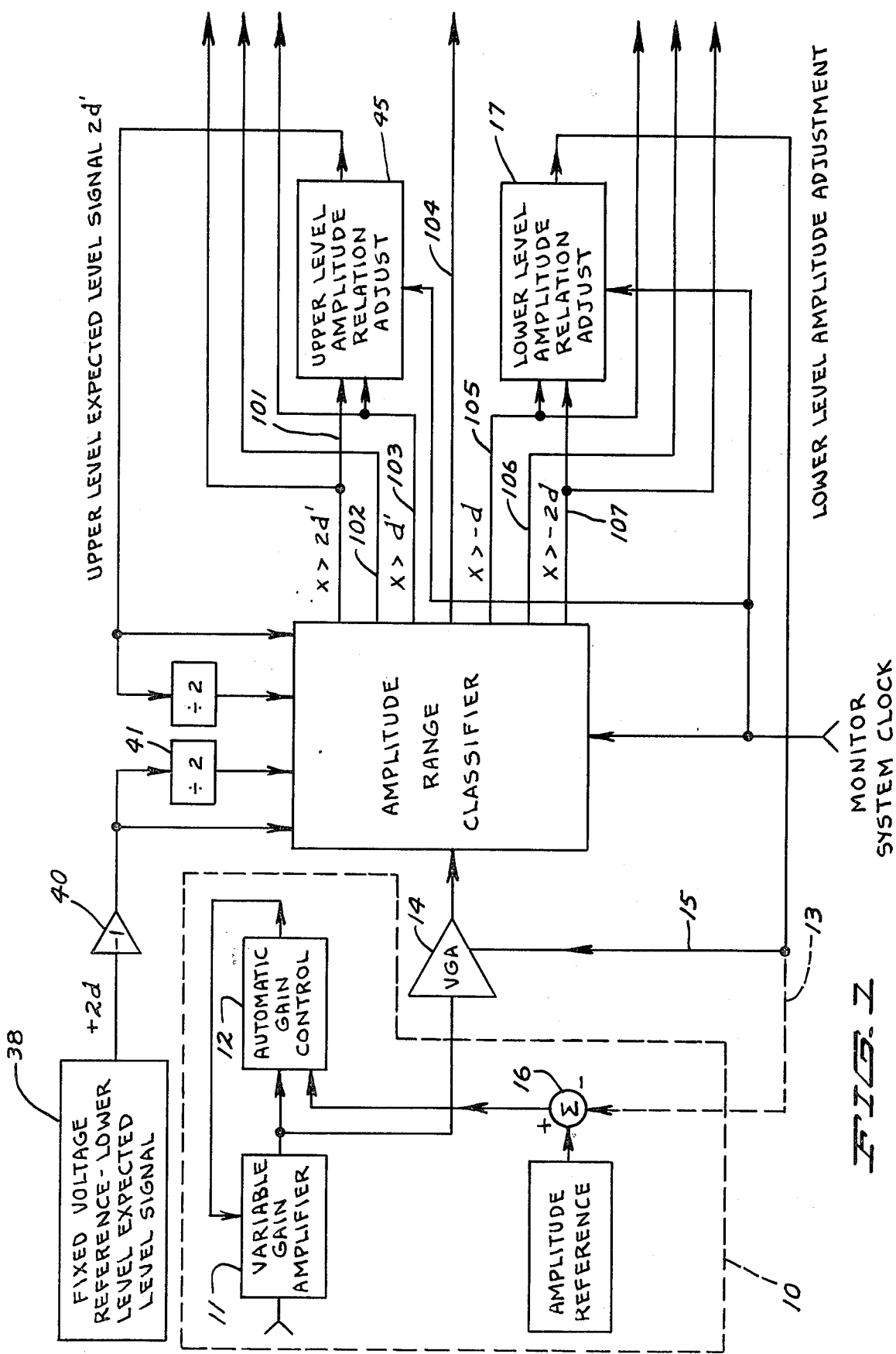
FIG. 2 is a schematic diagram of the expected level determination means of the present invention.

The preferred embodiment is described with respect to a performance monitor system for a three-level partial response digitally based communication channel. The center expected signal level is assumed to be zero volts.

Referring to the figures, for the situation where the receiver degradation is to be monitored in addition to degradation in transmission, the system of FIG. 1 assumes that the signal conditioning circuits in the receiver shown within dashed-line block 10—in particular, an automatic gain control system duplicated by a variable gain amplifier, 11, and by certain automatic gain control circuitry, 12—introduce degradadation in the receiver signals passing through them. Despite this circumstance, the amplitude control necessary for operating the monitoring system shown in FIG. 1 is shown provided in one alternative by using this receiver matched automatic gain control system. The receiver matched automatic gain control system is directed to vary the gain therethrough to the extent required by the monitoring system via the control signal line, 13.

A typical receiver automatic gain control system shortcoming is that the bandwidth of the variable gain amplifier therein, and so its phase, will change with changes in the amplifier gain setting. However, using the receiver matched variable gain amplifier saves providing one in the monitoring system, although possibly at the cost of introducing some added degradation in the signal delivered to the monitor system.

In those situations where either (i) ideal receiver equipment is designed to permit monitoring of essentially the communications channel prior to the receiver, or (ii) there is no cost need to avoid adding a variable gain amplifier to the monitoring system, the amplitude control requirements for the monitoring system can be met by adding a variable gain amplifier. Such a variable gain amplifier, 14, is shown in FIG. 1 ahead of the monitoring system and after the receiver dashed-line block 10 elements. Amplifier 14 has a reception input and a control input. The incoming baseband analog signal is received at the reception input. Amplifier 14 is controlled via control line, 15, connected to the control input, by the signals that would otherwise have been provided along control line 13. Hence, control line 13 (and the summing means used therewith, 16, for combining control signals with the reference signal for the receiver matched automatic gain control system) is entirely alternative to the use of the variable gain amplifier 14 with its control line 15. Hence, control line 13 is represented by a solid line portion and a dashed-line portion while control line 15 is shown by a solid line only in FIG. 1.

The control signals to adjust the amplitude of the baseband signals supplied to the monitor system, the control signals provided either along control line 13 or control line 15, are generated in a slow-acting feedback loop. This is because receiver systems will have slow-acting sources of amplitude errors degrading the incoming signal, errors that are desired to be eliminated since the receivers in actual use could otherwise be adjusted to eliminate them anyway. For instance, some receiver automatic gain control systems, which are insufficiently designed, vary with temperature at a very slow rate which may not occur in practice because the temperature will be maintained relatively constant about the receiver.

Again, slow-acting errors may occur because a peak amplitude detecting method is used to adjust the variable gain amplifier gain in the receiver automatic gain control system. The result is that the peak amplitude for the composite signal, constituting the data signal and the noise thereon, is taken equal to the peak amplitude which should be characteristic of the data signal along. In such circumstances, the result is that the data signal shrinks as the noise signal increases.

On the other hand, some receivers have relatively rapid acting sources of amplitude errors degrading the incoming signal that are not subject to being adjusted away. For example, additive impulse noise occurring in the channel link can cause signal gain level control by the receiver automatic gain control system to fluctuate rapidly with a resulting rapid variation in the amplitude of the signals present in the receiver.

The slow-acting feedback loop, for controlling the amplitude of the incoming baseband signal provided in the monitoring system, is designed to pass through the errors due to incoming signal degrading dynamic error sources in the receiver matched automatic gain control system. This is because the resulting errors could not be adjusted away in actual use and so would contribute to the receiver introduced signal degradation. However, the slow-acting amplitude control feedback loop eliminates the relatively slow changes due to causes such as temperature changes.

Because the slow-acting feedback control loop (i) supplies signals to either the receiver matched automatic gain control system, via line 13, or to the variable gain amplifier 14, via line 15, and either situation leads to controlling the amplitude of the incoming baseband signal in the receiver which is to be monitored by the monitoring system, and (ii) because any expected changes in the incoming signals irrespective of noise, as received by the receiver, are expected to be slow changes, the same slow-acting feedback system for controlling the amplitude of the incoming baseband signals from the receiver demodulator circuits can also be used for providing an expected level signal representing one of the expected incoming signal levels of the incoming signal. That is, this slow-acting, amplitude control feedback loop can be operated to control the incoming signal amplitude based on the concept of requiring half of the data samples obtained from the incoming signal, and associated with an expected incoming signal level, to have an amplitude value below that level and the other half of the data samples to have an amplitude value above that level.

This concept can be used to develop the particular expected level signal, in the presence of perturbing signal degradations, for an associated expected incoming signal level of the incoming baseband signal. Hence, the criteria of apportioning equally in amplitude the incoming data samples above and below the associated expected incoming signal level can be met through this criteria being the basis of the feedback sensing mechanism used in operating the slow-acting, amplitude control feedback loop. This is accomplished by providing a fixed reference level as the expected level signal associated with the chosen expected incoming signal level and controlling the incoming baseband signal amplitude so that the apportioning requirement is met.

The components of the slow-acting, amplitude control feedback loop can be found in FIG. 1 by tracing back from the point where signal lines 13 and 15 diverge to a block in the system diagram designated lower level amplitude relation adjust, 17. Block 17 in the system diagram of FIG. 1 has three inputs, a timing signal designated as the MONITOR SYSTEM CLOCK and two inputs from an amplitude range classifier 100.

This classifier acts to classify data samples taken from the incoming baseband analog signal by determining whether these data samples have amplitudes occurring in any of several amplitude subranges. Its outputs form a parallel group of logic signals indicating the range into which the incoming baseband analog signal level falls. Lines 101, 103, 105, and 107 carry signals for the ranges $X > 2d'$, $X > d'$, $X > -d$, and $X > -2d$, respectively. Each of these will assume a logical true value if the statement with which it is associated is true. The variable X represents the level of the incoming baseband analog signal. The meaning of the other variables will be explained below. Lines 102, 104, and 106 carry logic signals for other range classifications for use in other portions of the monitor circuit. More lines may be necessary, depending upon the nature of the monitor circuitry.

A voltage $+2d$ volts is obtained from a fixed voltage reference source, 38, and is defined to be, after passing through a polarity inverter, as the FIG. 1 LOWER LEVEL EXPECTED LEVEL SIGNAL of $-2d$ volts. As FIG. 1 shows and as is discussed below, this negative form of the signal from source 38 is used as a reference in the sensing mechanism of block 17 in the slow-acting, amplitude control feedback loop for controlling the amplitude of the incoming baseband analog signal. This arrangement permits the source 38 signal to satisfy the requirements for meeting its definition as the LOWER LEVEL EXPECTED LEVEL SIGNAL.

As just stated above, the voltage $-2d$ volts is obtained from the $+2d$ volts provided by source 38 through a polarity inverter, i.e. multiplication by $-1$, effected by a multiplier, 40, which can be provided by well-known operational amplifier circuits. The voltage $-d$ volts is provided through a divider, 41, operating on the voltage output from multiplier 40. Divider, 41, can be any of several precise and well known voltage divider circuits. The value $-d$ volts acts as the lower level decision level, i.e. a signal having a level less than or equal to $-d$ volts will be interpreted as having an intended level of $-2d$ volts.

The voltage value $+2d'$ can be obtained from the slow-acting feedback loop associated with providing an UPPER LEVEL EXPECTED LEVEL SIGNAL of $+2d'$ volts associated with the upper expected incoming signal level. This loop operates much like the one being described in connection with the lower expected incoming signal level. However, the slow-acting feedback loop associated with the upper expected incoming signal level does not, of course, act also to control the amplitude of the incoming baseband analog signals since that control mode is already preempted by the slow-acting, amplitude control feedback loop associated with the lower expected incoming signal level currently being described.

On the contrary, the slow-acting feedback loop associated with the upper expected incoming signal level accepts the incoming baseband analog signal amplitude as a given and then directly develops the UPPER LEVEL EXPECTED LEVEL SIGNAL value, $+2d'$ volts. The value for $+2d'$ developed is just that, to effect an apportionment by amplitude of half of those data samples obtained from the incoming signal which are associated with the upper expected incoming signal level to occurring above that level and the other half to occurring below that level.

The value $+d'$ volts can be obtained from the $+2d'$ volts of the UPPER LEVEL EXPECTED LEVEL SIGNAL through a divider, 43, constructed much as divider 41, and serves as the upper level decision level in a manner similar to the lower level decision level, $-d$ volts.

Turning now to the lower level amplitude relation adjust block 17, the signal LOWER LEVEL AMPLITUDE ADJUSTMENT, to be provided either along lines 13 or 15, is generated at the output of this block. This signal controls the amplitude of the incoming baseband analog signal as provided to the amplitude range classifier 100, either increasing the incoming signal amplitude if this signal has an amplitude detected by block 17 to be too small or decreasing the amplitude if the incoming signal is detected as being too large. To increase the incoming signal level, as indicated previously, the LOWER LEVEL AMPLITUDE ADJUSTMENT signal is either summed in summing circuit 16 to change the amplitude reference responded to by the receiver matched automatic gain control, or this control signal is used to control the gain level of variable gain amplifier 14. The components comprising block 17 are shown in FIG. 2.

FIG. 2 also represents what is comprised in the block associated with the upper expected incoming signal level, this block being designated as the upper level amplitude relation adjust, 45. That is, there is a block in the slow-acting, amplitude control feedback loop associated with the upper expected incoming signal level to more or less match block 17 in the slow-acting, amplitude control feedback loop associated with the lower expected incoming signal level. Therefore, a second set of input and output signals are shown in FIG. 2 which correspond to those used in block 45.

For block 17, input logic signals are $(X > -d)$ and $(X > -2d)$ while, as indicated above, the analog output signal is LOWER LEVEL AMPLITUDE ADJUSTMENT as shown in both FIGS. 1 and 2. For block 45, the input logic signals are $(X > +d')$ and $(X > +2d')$. As set out above, the output of block 45 directly determines what the UPPER LEVEL EXPECTED LEVEL SIGNAL $+2d'$ volts actually is in value. The output of block 17, on the other hand, directs gain control of the incoming baseband analog signal about a fixed reference provided for the LOWER LEVEL EXPECTED LEVEL SIGNAL $-2d$ volts. Hence, the output of block 45 has been labeled UPPER LEVEL EXPECTED LEVEL SIGNAL.

Now describing block 17 in FIG. 2, shown there are three signals presented to an up/down counter, 46, which has three inputs for receiving them. The first counter 46 input is a clocking input which is connected to receive the MONITOR SYSTEM CLOCK signal, a signal which is derived from the incoming baseband analog signal and which acts in each baud period to alter the count total kept in up/down counter 46, but which can actually alter this count total only if counter 46 has been enabled. Whether counter 46 is enabled or not is determined by the logic signal $(X > -d)$ provided by the amplitude range classifier, 100, passed through an inverter, 47. The output of inverter 47 is connected to the enable input of up/down counter 46. Inverter 47 effectively changes the logic signal $(X > -d)$ at its input to the logic signal $(X \leq -d)$ at its output, again with this logic signal being in the true or high logic state if the inequality therein is satisfied. Whether up/down counter 46 counts up or down, i.e. increases or decreases its count total stored therein, is determined by the logic signal $(X > -2d)$, also provided by the amplitude range classifier 100, and supplied to the up/down decision input of counter 46.

Since counter 46 is associated with the lower expected incoming signal level, this counter may be termed an expectation counter. Counter 46 has twelve taps at the twelve most significant bits at its output indicating the count total therein. These taps supply in each baud period a digital number indicating the counter 46 count total in its twelve most significant places to a digital-to-analog converter, 48, connected to the counter 46 output taps.

However, counter 46 should have the capability of keeping a count total of up to somewhere around $2^{20}$, that is, well beyond the count total maximum of $2^{12}$ which would be due to the bit positions supplied to converter 48. Alternatively, two counters could be used, a counter with a $2^8$ count total capability connected serially to another counter with a $2^{12}$ count total capability which would supply converter 48. The eight extra count positions represents a division of the counts which would otherwise accumulate in counter 46 to increase the time constant of the slow-acting, amplitude control feedback loop.

The actual time constant to be chosen depends to some extent on the conditions in which the loop is to be effective, that is, the disturbances which the loop is to be capable of counteracting as selected on the basis of disturbance event rapidity. However, a count total capability in counter 46 of $2^{20}$ is typically satisfactory to accomplish the goal set out above of obviating temperature change introduced errors in the incoming baseband analog signal without, however, correcting errors from more rapidly operating error sources.

The function of the lower level amplitude relation adjust block 17 is to adjust the incoming baseband analog signal amplitude so that half of those data samples obtained from this signal and associated with the lower expected incoming signal level, $-2d$, have amplitudes below this $-2d$ volts reference level serving as the LOWER LEVEL EXPECTED LEVEL SIGNAL, and so the other half of the data samples have amplitudes occurring above that 31 2d reference. To accomplish this, the logic signal $(X > -d)$ is provided to the enable input of counter 46 so that only data samples intended to have an amplitude level equal to the lower expected incoming signal level are permitted to affect the counter.

The logic signal $(X > -2d)$ is used to control the counting direction of counter 46 in each baud period. When the incoming baseband analog signal is of a relatively small amplitude, the $(X > -2d)$ logic signal will be true more often than false for data samples associated with the lower expected incoming signal level thus causing counter 46 to count up more often than down. The opposite situation will be true for incoming baseband analog signals that are relatively large. A net surplus of upward counts relative to downward counts over time causes the count totaL in counter 46 to increase over the same time thereby increasing the count total provided to the converter 48. A net deficit over time, on the other hand, decreases this count total over the same time.

Converter 48, in turn, provides at its output an increasing analog voltage representative of an increasing count total supplied to it by counter 46, or a decreasing voltage for a decreasing count total. An increasing signal at the output of converter 48, the LOWER LEVEL AMPLITUDE ADJUSTMENT signal, serves to drive either the receiver matched automatic gain control system or variable gain amplifier 14 in such a manner to increase the amplitude of the incoming baseband analog signal. A decreasing output signal from converter 48 will have the opposite effect. Thus, the slow-acting, amplitude control feedback loop associated with the lower expected incoming signal level adjusts the incoming baseband analog signal as necessary to cause half of the data samples obtained from this signal and associated with the lower expected level to have amplitude occurring below the $-2d$ reference level and the other half to have amplitudes occurring above that level.

As indicated previously, one may also wish to calculate the upper expected incoming signal level. To do so properly requires another feedback loop to determine the precise expected incoming signal level value, at least where symmetry about the zero reference in the incoming signal cannot be relied upon. Incoming baseband analog signals having more expected incoming signal levels might have further feedback loops associated therewith.

The slow-acting expected level determining feedback loop for the upper expected incoming signal level includes upper level amplitude relation adjust box 45 and uses the signals $X>d'$ and $X>2d'$ provided by the amplitude range classifier, 100. This upper expected incoming signal level feedback loop operates just as the one described in connection with the lower expected incoming signal level in the foregoing, but rather than adjusting the incoming signal amplitude, the UPPER LEVEL EXPECTED LEVEL SIGNAL is developed directly to have a magnitude that just apportions by amplitude the data samples obtained from the incoming signal and associated with the upper expected incoming signal level equally on either side thereof.

Thus, in general, the expected level signal for an expected incoming signal level may be provided by either adjusting the incoming baseband analog signal amplitude in connection with a fixed expected level signal or by adjusting the expected level signal itself. The adjustment is made as necessary to provide the desired equal apportionment by amplitude of data samples obtained from the incoming signal on either side of whatever is serving as the expected level signal. On the other hand, once the incoming baseband analog signal amplitude is adjusted for one expected incoming signal level, the feedback loops for the other expected incoming signal levels must be operated by adjusting the expected level signal itself to provide the proper apportionment.

The embodiments of the invention in which an exclusive property or right is claimed are defined as follows:

1. An expected signal level decision means to establish, for a corrupted incoming signal recognized as a sequence of data samples, that expected level signal which those said data samples within a selected range thereof are expected to substantially equal if said incoming signal were not so corrupted, said expected level decision means comprising:

an incoming signal amplitude range classifier for determining whether said data samples from said incoming signal are within certain amplitude ranges and having first and second classifier outputs, said incoming signal amplitude range classifier being capable of providing (i) as a first classifier output signal an indication for each said data sample, at said first classifier output, whether that said data sample has a value that is within said selected range, and providing (ii) as a second classifier output signal an indication for each said data sample, at said second classifier output, whether that said data sample has a value above or below that of said expected level signal;

a counter means connected to both said first and second classifier outputs, and which has a counter means output, said counter means being capable of keeping count total therein and being capable of being enabled to alter said count total by said first classifier output signal and said counter means being capable of being directed whether to increase or decrease said count total by said second classifier output signal, said counter means being capable of providing at said counter means output, as said counter means output signal, a signal having a value which indicates whatever count total has been reached in said counter means; and an incoming signal-expected level adjustment means having an adjustment means input connected to said counter means output, said incoming signal-expected signal level adjustment means being capable of adjusting an amplitude relationship occurring between said incoming signal and said expected signal level in response to said counter means output signal.

2. The apparatus of claim 1 wherein said incoming signal-expected level signal adjustment means comprises an adjusting variable gain amplifier means having a reception adjusting variable gain amplifier input and a control adjusting variable gain amplifier input and having an adjusting variable gain amplifier output, said reception adjusting variable gain amplifier input adapted to receive an unadjusted version of said incoming signal and said control adjusting variable gain amplifier input serving as said adjustment means input, said incoming signal being provided through signals occurring at said adjusting variable gain amplifier output, said expected level signal having a selected substantially constant value.

3. The apparatus of claim 1 wherein there is a receiver in a system to be monitored and said receiver has therein a receiver amplifier having a receiver amplifier input and a receiver amplifier output, said receiver amplifier receiving an unadjusted version of said incoming signal at said receiver amplifier input and said incoming signal being obtained from signals occurring at said receiver amplifier output, said receiver amplifier being capable of being arranged to serve as a variable gain amplifier with respect to signals present at said receiver amplifier input by varying signal amplification therethrough in response to signals appearing at a terminal in said receiver amplifier serving as a receiver amplifier control input, said adjustment means input being adapted for connection to said receiver amplifier control input, said expected level signals having a selected substantially constant value.

4. The apparatus of claim 1 wherein said incoming signal expected level signal adjustment means is capable of varying said expected level signal.

5. The apparatus of claim 1, claim 2, claim 3, or claim 4 wherein said counter means includes an up/down counter means having a first and second up/down counter means input and having an up/down counter means output capable of providing a parallel n-bit signal indicative of said count total, said first up/down counter input being connected to said first classifier output and said second up/down counter input being connected to said third classifier output, and wherein said counter means also includes a digital-to-analog converter having a digital-to-analog converter input capable of accepting a parallel m-bit signal and having a digital-to-analog converter output, said digital-to-analog converter input being connected to said up/-down counter output and said digital-to-analog converter serving as said counter means output.

6. The apparatus of claim 5, wherein n is greater than m.

* * * * *